(12) United States Patent
Kondo (10) Patent No.: US 7,210,029 B2
(45) Date of Patent: Apr. 24, 2007

(54) SYSTEM AND METHOD FOR TRANSFERRING REWRITE PROGRAMS TO TWO COMPUTERS IN A PROCESSING SYSTEM

(75) Inventor: Haruhiko Kondo, Kasugai (JP)

(73) Assignee: DENSO Corporation, Kariya (JP)

( * ) Notice: Subject to any disclaimer, the term of this patent is extended or adjusted under 35 U.S.C. 154(b) by 490 days.

(21) Appl. No.: 10/775,130

(22) Filed: Feb. 11, 2004

(65) Prior Publication Data

US 2004/0168048 A1 Aug. 26, 2004

(30) Foreign Application Priority Data

Feb. 24, 2003 (JP) ............................. 2003-045679

(51) Int. Cl.
*G06F 9/00* (2006.01)
(52) U.S. Cl. ............................. 713/1; 713/2; 713/100
(58) Field of Classification Search .................... 713/1, 713/2, 100; 717/168–178
See application file for complete search history.

(56) References Cited

U.S. PATENT DOCUMENTS 5,689,640 A * 11/1997 Okanoue ..................... 709/221
6,904,457 B2 * 6/2005 Goodman .................... 709/221
6,954,853 B2 * 10/2005 Wang et al. .................... 713/2
2002/0188937 A1 * 12/2002 Webster et al. .............. 717/171
2004/0068721 A1 * 4/2004 O'Neill et al. ............... 717/168

FOREIGN PATENT DOCUMENTS

| JP | 7-295943 | 11/1995 |
| JP | 11-96082 | 4/1999 |
| JP | 2000-148466 | 5/2000 |
| JP | 2000-259422 | 9/2000 |

\* cited by examiner

*Primary Examiner*—Rehana Perveen
*Assistant Examiner*—Paul Yanchus, III
(74) *Attorney, Agent, or Firm*—Nixon & Vanderhye P.C.

(57) ABSTRACT

A processing system includes microcomputers A, B. A rewrite program for the microcomputer A includes a transfer routine for transferring a rewrite program for the microcomputer B. When a program rewrite unit outputs the rewrite program for the microcomputer B, the microcomputer A executes the transfer routine to transfer the rewrite program for the microcomputer B. A boot program of each microcomputer thereby need not be modified even when a flash memory storing the boot program of the microcomputer B is replaced with a mask ROM or the like. This enables the processing system to flexibly meet various applications.

15 Claims, 5 Drawing Sheets

SYSTEM AND METHOD FOR TRANSFERRING REWRITE PROGRAMS TO TWO COMPUTERS IN A PROCESSING SYSTEM

CROSS REFERENCE TO RELATED APPLICATIONS

This application is based on and incorporates herein by reference Japanese Patent Application No.2003-45679 filed on Feb. 24, 2003.

FIELD OF THE INVENTION

The present invention relates to a processing system having multiple electronic units, the processing system where operation programs executed by the respective electronic units are rewritten.

BACKGROUND OF THE INVENTION

An electronic unit is well-known that operates according to an operation program stored in a non-volatile memory of the electronic unit itself. In this electronic unit, the operation program stored in the non-volatile memory can be rewritten (or updated), using an external unit that is separately prepared, for version upgrade of the program.

In detail, a boot program is previously stored in a non-volatile memory, for communicating with an external unit and downloading a rewrite program (software) for rewriting. As the rewrite program is downloaded using the boot program, the processing sequence is handed over to the rewrite program. The rewrite program retrieves an operation program for rewriting and stores it in the non-volatile memory.

Recently, a processing system having multiple electronic units becomes available. In this processing system, when individual operation programs of the electronic units are rewritten, a boot program of a primary electronic unit of the multiple electronic units is used for downloading the rewrite programs of the primary electronic unit and other secondary electronic units.

However, this processing system includes various conditions. For instance, a given processing system has no secondary electronic unit, while a certain processing system has a secondary electronic unit prohibiting the rewriting of its operation program. Therefore, the boot program stored in the primary electronic unit needs to be prepared and appropriately applied for each of the various conditions.

SUMMARY OF THE INVENTION

It is an object of the present invention to provide a processing system having multiple electronic units, the processing system which includes a boot program can be used for various conditions of the processing system.

To achieve the above object, a processing system including at least two electronic units is provided with the following. Each electronic unit stores an operating program. It retrieves, from an external unit, a rewrite program for rewriting the stored operation program. It newly retrieves, from the external unit or the other electronic unit, an operation program by executing the retrieved rewrite program. It then rewrites the stored operation program using the newly retrieved operation program. Here, the rewrite program for a first (primary) electronic unit includes a transfer routine for transferring to a second (secondary) electronic unit a rewrite program for the second electronic unit. When the first electronic unit receives, from the external unit, a rewrite request for rewriting the second operation program, the first electronic unit executes the transfer routine to transfer the second rewrite program to the second electronic unit.

In this structure, the retrieving means (boot program) of the first (primary) electronic unit only needs to have a function of retrieving the own rewrite program. This eliminates need of changing the retrieving means for various conditions, simplifying a structure of the boot program itself.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
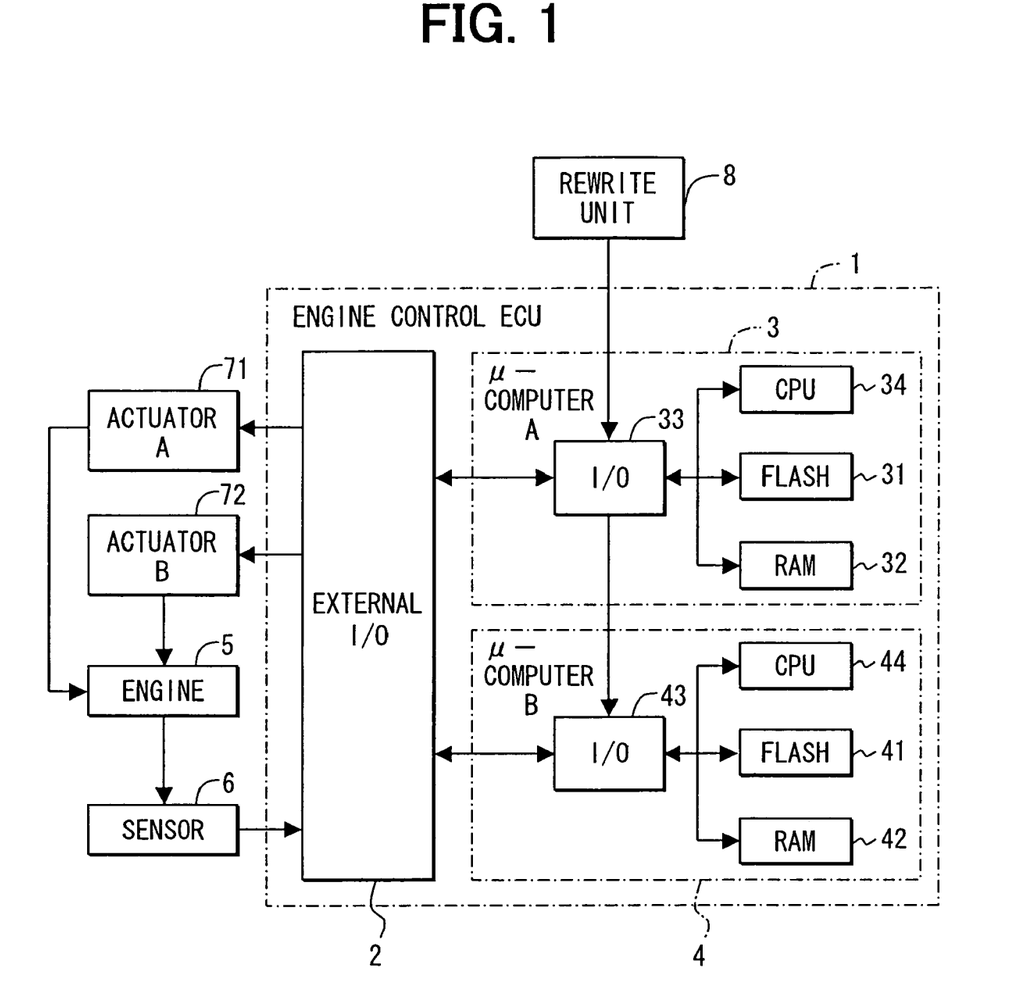
FIG. 1 is a block diagram showing an overall structure of a processing system according to an embodiment of the present invention.

A processing system according to an embodiment of the present invention is constructed as an electronic control unit (ECU) 1 for engine control of a vehicle. The ECU 1 includes a microcomputer (μ-computer) A 3, a microcomputer (μ-computer) B 4, and an external I/O circuit 2.

The external I/O circuit 2 receives sensor information from various sensors 6 for detecting operating states of an engine 5, to output the sensor information to the microcomputer A 3 and microcomputer B 4. It further receives control signals from the microcomputer A 3 or microcomputer B 4 to output the control signals to an actuator A 71 and an actuator B 72.

The microcomputer A 3 as a primary unit has a flash memory 31, a RAM 32, an I/O circuit 33, and a CPU 34. The flash memory 31 of a non-volatile memory stores a control program (operation program) executed by the microcomputer A 3. The flash memory 31 further has a boot program executed at a starting and resetting timings of this processing system. The boot program as a retrieving means reads (retrieves) a rewrite program for rewriting the control program from an external unit.

The RAM 32 as a memory temporarily stores a result computed by the CPU 34 executing the control program, and further stores the rewrite program retrieved by the boot program when the control program is rewritten. This structure enables a storing area of the RAM 32 to be used for a storing area when the microcomputer A 3 executes the control program after the control program is rewritten, enhancing efficiency of the storing area.

The I/O circuit 33 receives the sensor information from the external I/O circuit 2 to output the sensor information to the CPU 34. It further receives the control signals for the actuator A 71 outputted from the CPU 34 to output them to the external I/O circuit 2. By contrast, when the control program stored in the flash memory 31 is rewritten, the I/O circuit 33 retrieves a control program or a rewrite program from a program rewrite unit 8 to output it to the CPU 34 or the microcomputer B 4.

The CPU 34 is constructed of a well-known microprocessor. The CPU 34 usually operates according to the control program stored in the flash memory 31 and generates control signals for controlling the actuator A 71 based on the received sensor information from the I/O circuit 33. The generated control signals are outputted to the I/O circuit 33. By contrast, when the control program stored in the flash memory 31 is rewritten, the CPU 34 retrieves using the boot program the control program outputted from the program rewrite unit 8 via the I/O circuit 33, and stores it in the RAM 32. Thereafter, the CPU 34 invokes the rewrite program from the RAM 32 to execute it, and retrieves the control program outputted from the program rewrite unit 8 via the I/O circuit 33. The CPU 34 further then rewrites the control program stored in the flash memory 31 or outputs a program to the microcomputer B4.

In particular, in this embodiment, the rewrite program executed by the microcomputer A 3 includes a transfer routine for transferring to the microcomputer B 4 a rewrite program for the microcomputer B 4 that is retrieved from the program rewrite unit 8. By executing the transfer routine, the CPU 34 transfers the retrieved rewrite program for the microcomputer B 4 via the I/O circuit 33 to the microcomputer B 4.

The microcomputer B 4 as a secondary unit has a flash memory 41, a RAM 42, an I/O circuit 43, and a CPU 44, and controls the actuator B 72. The flash memory 41 of a non-volatile memory stores a control program (operation program) for controlling the actuator B 72. The flash memory 41 further has a boot program executed at a starting and resetting timings of this processing system.

The RAM 42 as a memory temporarily stores a result computed by the CPU 44 executing the control program, and further stores a rewrite program retrieved by the boot program when the control program is rewritten.

The I/O circuit 43 receives the sensor information from the external I/O circuit 2 to output the sensor information to the CPU 44, and receives the control signals for the actuator B 72 outputted from the CPU 44 to output them to the external I/O circuit 2. By contrast, when the control program stored in the flash memory 41 is rewritten, the I/O circuit 43 retrieves a control program or a rewrite program from the microcomputer A 3 to output it to the CPU 44.

The CPU 44 is constructed of a well-known microprocessor. The CPU 44 usually operates according to the control program stored in the flash memory 41 and generates control signals for controlling the actuator B 72 based on the received sensor information from the I/O circuit 43. The generated control signals are outputted to the I/O circuit 43. By contrast, when the control program stored in the flash memory 31 is rewritten, the CPU 44 retrieves using the boot program the control program outputted from the microcomputer A 3 via the I/O circuit 43, to store it in the RAM 42. Thereafter, the CPU 44 invokes the rewrite program from the RAM 42 to execute it, and then rewrites the control program stored in the flash memory 41 into the control program newly outputted from the microcomputer A 3.

Figure 2A:
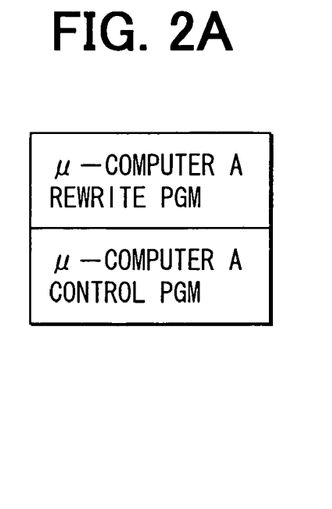
FIGS. 2A, 2B are diagrams showing orders of outputting programs from a program rewrite unit according to the embodiment.
Figure 2B:
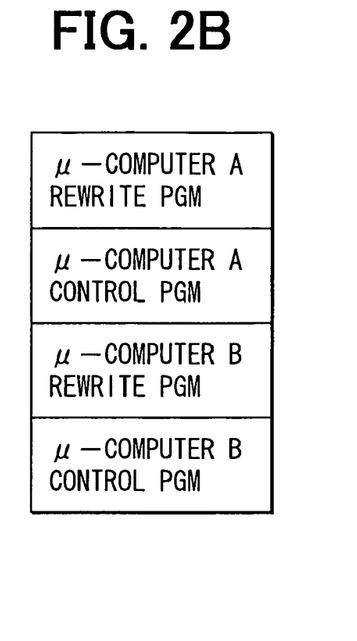

The program rewrite unit 8 as an external unit outputs a control program and rewrite program to the microcomputer A 3. When only a control program for the microcomputer A 3 is rewritten, the control program for the microcomputer A 3 is outputted after a rewrite program for the microcomputer A 3 is outputted, as shown in FIG. 2A. By contrast, when both the control programs for the microcomputer A 3 and microcomputer B 4 are rewritten, a rewrite program and control program for the microcomputer B 4 are outputted after a rewrite program and control program for the microcomputer A 3 are outputted, as shown in FIG. 2B.

Figure 3:
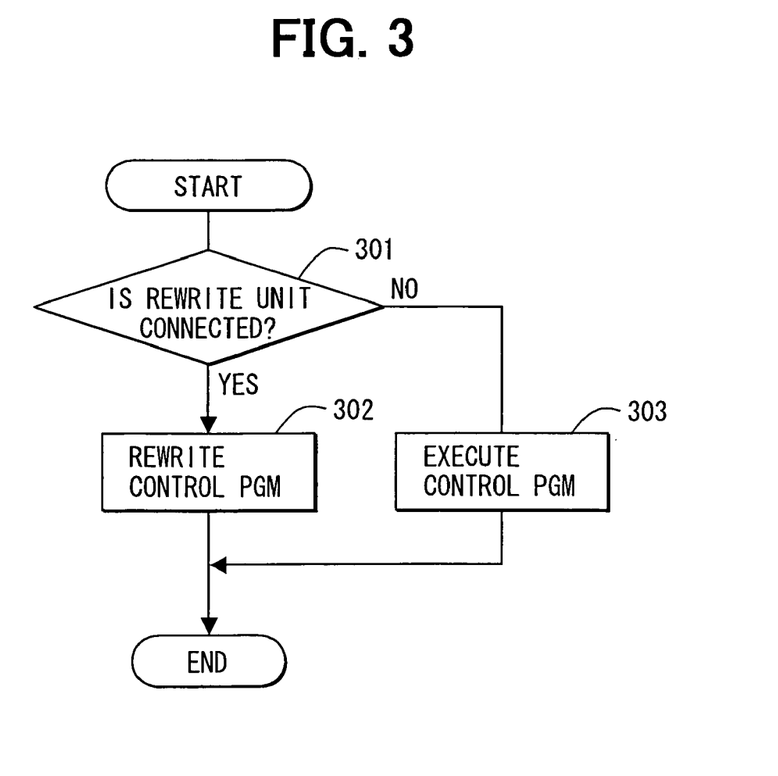
FIG. 3 is a flowchart diagram explaining a main processing of the processing system according to the embodiment.

Next, processing at a starting or resetting timing of the processing system will be explained with reference to FIG. 3. This flowchart is repeatedly executed each time a power switch (not shown) of this system is turned on or a reset switch (not shown) is pushed.

At Step 301, the microcomputer A 3 determines whether the program rewrite unit 8 is being connected with the ECU 1 for engine control. When it is being connected, the processing proceeds to Step 302. When it is not being connected, the processing proceeds to Step 303.

At Step 302, the control programs for the microcomputer A 3 and microcomputer B 4 are rewritten, terminating the processing. This processing at Step 302 will be explained later in detail. By contrast, at Step 303, the microcomputer A 3 and microcomputer B 4 invoke the control programs from the flash memory 31 and flash memory 41, respectively, starting operation control of the engine 5.

Figure 4:
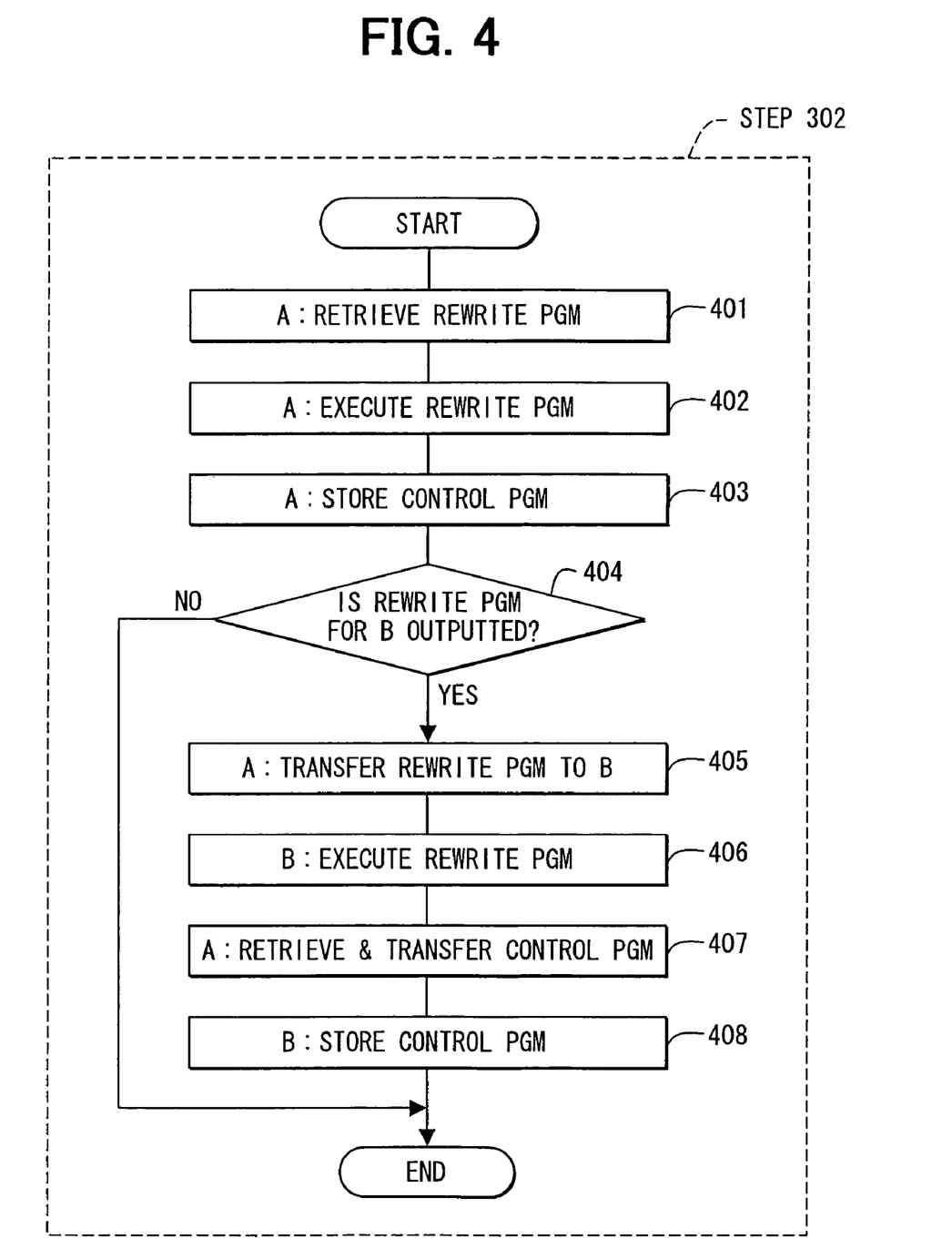
FIG. 4 is a flowchart diagram explaining processing of rewriting a control program according to the embodiment.
Figure 5:
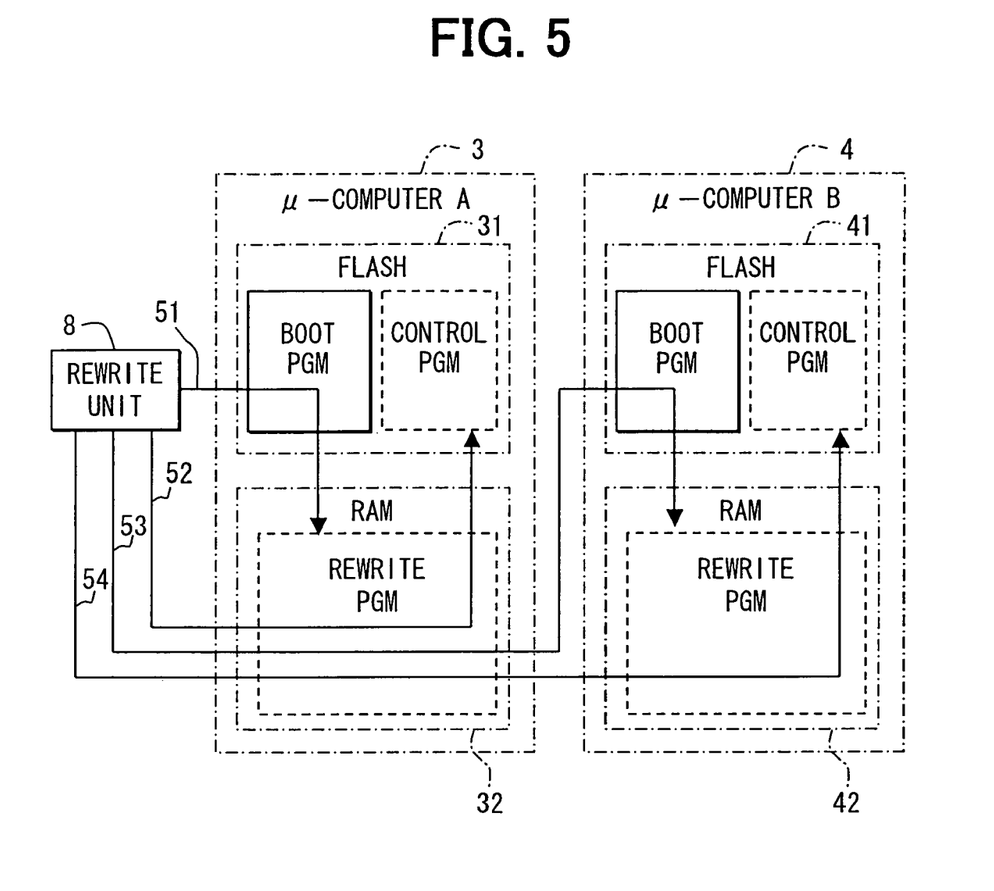
FIG. 5 is a diagram showing a data flow in the processing in FIG. 4.

Next, the processing at Step 302 for rewriting a control program will be explained with reference to FIGS. 4, 5. FIG. 4 shows a flowchart of the processing, while FIG. 5 shows a data flow in the processing in FIG. 4. Here, the program rewrite unit 8 outputs the control program and rewrite program in an order shown in FIG. 2A or FIG. 2B.

At Step 401, the microcomputer A 3 retrieves the rewrite program from the program rewrite unit 8 using the boot program to store it in the RAM 32 (arrow 51 in FIG. 5). At Step 402, the microcomputer A 3 invokes using the boot program the rewrite program stored in the RAM 32 to execute it.

At Step 403, the microcomputer A 3 retrieves the control program from the program rewrite unit 8 using the rewrite program to store it in the flash memory 31 (arrow 52 in FIG. 5). This enables the microcomputer A 3 to rewrite the control program before the microcomputer A 3 outputs the rewrite program and control program for the microcomputer B 4.

At Step 404, the microcomputer A 3 waits for a given period to determine whether the program rewrite unit 8 outputs a rewrite program, that is, whether a request for rewriting the control program for the microcomputer B 4 is outputted. When the program rewrite unit 8 outputs the rewrite program, the processing proceeds to Step 405. Here, the microcomputer A 3 executes the transfer routine included in the rewrite program to transfer the rewrite program to the microcomputer B 4. By contrast, when the program rewrite unit 8 outputs no rewrite program, the processing is then terminated.

At Step 406, the microcomputer B 4 retrieves the rewrite program outputted from the microcomputer A 3 using the boot program to store it in the RAM 42. The microcomputer B 4 further invokes and executes the rewrite program (arrow 53 in FIG. 5). At Step 407, the microcomputer A 3 retrieves the control program outputted from the program rewrite unit 8, to output it to the microcomputer B 4. At Step 408, the microcomputer B 4 retrieves using the rewrite program the control program outputted from the microcomputer A 3 and stores it in the flash memory 41 (arrow 54 in FIG. 5).

Thus, in this processing system of the present invention, a rewrite program for the microcomputer A 3 has a transfer routine for transferring a rewrite program for the microcomputer B 4 to the microcomputer B 4. When the program rewrite unit 8 outputs a rewrite program for the microcomputer B 4, the microcomputer A 3 executes the transfer routine to transfer the rewrite program for the microcomputer B 4 to the microcomputer B 4. This structure eliminates the need of the modification of the boot program, being applied to various conditions or applications. For instance, a boot program of each microcomputer thereby need not be modified so that a flash memory storing the boot program of the microcomputer can be replaced with a mask ROM or the like. This also enables the boot program to be simplified.

(Modification)

A modification of the above embodiment will be explained below. This modification has a feature enabling rewriting of only a control program for the microcomputer B 4.

Figure 6:
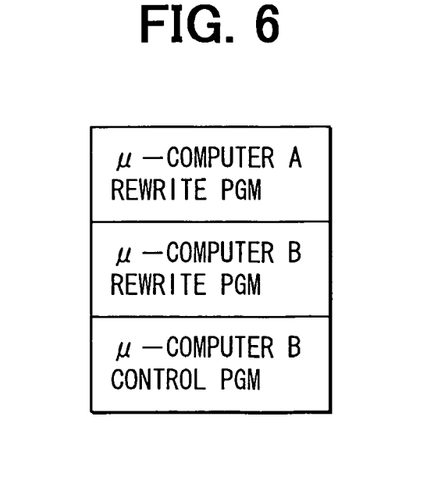
FIG. 6 is a diagram showing an order of outputting programs from a program rewrite unit according to a modification of the present invention.

A program rewrite unit 8 of this modification attaches, to a given program, a label indicating whether the given program is a rewrite program for a microcomputer B 4 when the program rewrite unit 8 outputs control programs or rewrite programs for microcomputers. When only a control program for the microcomputer B 4 is rewritten, the program rewrite unit 8 outputs a rewrite program and control program for the microcomputer B4 after it outputs a rewrite program for the microcomputer A 3, as shown in FIG. 6. Here, other functions are same as that of the forementioned embodiment, so that explanation will be eliminated.

Figure 7:
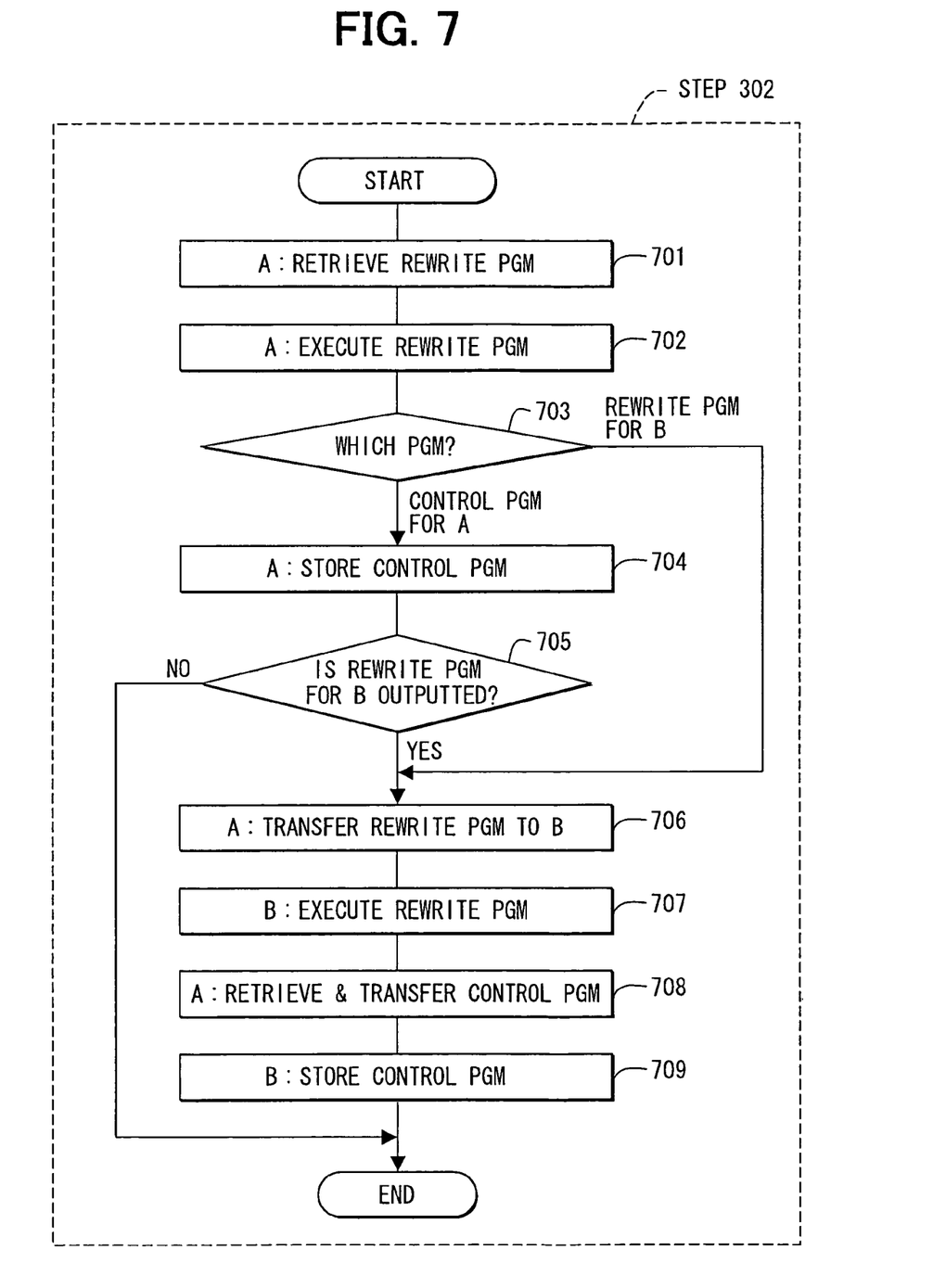
FIG. 7 is a flowchart diagram explaining processing of rewriting a control program according to the modification.

Processing of this modification will be explained with reference to FIG. 7. Here, the control programs for the microcomputer A 3 and the microcomputer B 4 are rewritten. This flowchart has an additional processing at Step 703 in FIG. 7 in comparison with the flowchart in FIG. 4. In detail, at Step 703, it is determined which program is outputted, a rewrite program for the microcomputer B or a control program for the microcomputer A 3. Other processings of the modification are same as that shown in FIGS. 3, 4, so that explanation will be eliminated.

Again, at Step 703, the microcomputer A 3 determines which program is outputted, a rewrite program for the microcomputer B or a control program for the microcomputer A 3. This determination is executed by referring to a label being attached to an outputted program. When the control program for the microcomputer A 3 is outputted, the processing proceeds to Step 704, where the retrieved control program is stored in the flash memory 31. By contrast, when the rewrite program for the microcomputer B 4 is outputted, the processing proceeds to Step 706, where the microcomputer A 3 executes a transfer routine to transfer the retrieved rewrite program to the microcomputer B 4. This structure enables only a control program for the microcomputer B 4 to be rewritten.

It will be obvious to those skilled in the art that various changes may be made in the above-described embodiments of the present invention. However, the scope of the present invention should be determined by the following claims.

What is claimed is:

1. A processing system including at least a first electronic unit and a second electronic unit, the first electronic unit operating according to a first operation program, comprising:

first storing means for storing the first operating program; and first retrieving means for retrieving, from an external unit, a first rewrite program for rewriting the first operation program stored in the first storing means, wherein the first electronic unit newly retrieves, from the external unit, a first operation program by executing the first rewrite program retrieved by the first retrieving means to rewrite the first operation program stored in the first storing means using the newly retrieved first operation program, the second electronic unit operating according to a second operation program, comprising:

second storing means for storing the second operating program; and second retrieving means for retrieving, through the first electronic unit, a second rewrite program for rewriting the second operation program stored in the second storing means, wherein the second electronic unit newly retrieves, through the first electronic unit, a second operation program by executing the second rewrite program retrieved by the second retrieving means to rewrite the second operation program stored in the second storing means using the newly retrieved second operation program, wherein the first rewrite program includes a transfer routine for transferring the second rewrite program to the second electronic unit, and wherein, when the first electronic unit receives, from the external unit, a rewrite request for rewriting the second operation program, the first electronic unit executes the transfer routine to transfer the second rewrite program to the second retrieving means of the second electronic unit.

2. The processing system of claim 1, wherein, when the external unit rewrites the first and second operating programs, the external unit outputs the second rewrite program to the first electronic unit and then outputs the second operation program after the external unit rewrites the first operating program by the first rewrite program.

3. The processing system of claim 1, wherein the first storing means includes a first nonvolatile memory for storing the first operating program and a first memory for storing the first rewrite program, while the second storing means includes a second nonvolatile memory for storing the second operating program and a second memory for storing the second rewrite program.

4. A processing system including at least a first electronic unit and a second electronic unit, the first electronic unit operating according to a first operation program, comprising:

a first memory for storing the first operating program; and first retrieving circuitry for retrieving, from an external unit, a first rewrite program for rewriting the first operation program stored in the first memory, wherein the first electronic unit newly retrieves, from the external unit, a first operation program by executing the first rewrite program retrieved by the first retrieving circuitry to rewrite the first operation program stored in the first memory using the newly retrieved first operation program, the second electronic unit operating according to a second operation program, comprising:

a second memory for storing the second operating program; and second retrieving circuitry for retrieving, through the first electronic unit, a second rewrite program for rewriting the second operation program stored in the second memory, wherein the second electronic unit newly retrieves, through the first electronic unit, a second operation program by executing the second rewrite program retrieved by the second retrieving circuitry to rewrite the second operation program stored in the second memory using the newly retrieved second operation program, wherein the first rewrite program includes a transfer routine for transferring the second rewrite program to the second electronic unit, and wherein, when the first electronic unit receives, from the external unit, a rewrite request for rewriting the second operation program, the first electronic unit executes the transfer routine to transfer the second rewrite program to the second retrieving circuitry of the second electronic unit by bypassing the first retrieving circuitry of the first electronic unit.

5. The processing system of claim 4, wherein, when the external unit rewrites the first and second operating programs, the external unit outputs the second rewrite program to the first electronic unit and then outputs the second operation program after the external unit rewrites the first operating program by the first rewrite program.

6. The processing system of claim 4, wherein the first memory includes a first nonvolatile memory for storing the first operating program and a memory for storing the first rewrite program, while the second memory includes a second nonvolatile memory for storing the second operating program and a memory for storing the second rewrite program.

7. A processing system including at least a first electronic unit and a second electronic unit, the first electronic unit operating according to a first operation program, comprising:

a first memory for storing the first operating program; and first retrieving circuitry for retrieving, from an external unit, a first rewrite program for rewriting the first operation program stored in the first memory, wherein the first electronic unit newly retrieves, from the external unit, a first operation program by executing the first rewrite program retrieved by the first retrieving circuitry to rewrite the first operation program stored in the first memory using the newly retrieved first operation program, the second electronic unit operating according to a second operation program, comprising:

a second memory for storing the second operating program; and second retrieving circuitry for retrieving, through the first electronic unit, a second rewrite program for rewriting the second operation program stored in the second memory, wherein the second electronic unit newly retrieves, through the first electronic unit, a second operation program by executing the second rewrite program retrieved by the second retrieving circuitry to rewrite the second operation program stored in the second memory using the newly retrieved second operation program, wherein the first rewrite program includes a transfer routine for transferring the second rewrite program to the second electronic unit, and wherein, when the first electronic unit receives, from the external unit, a rewrite request for rewriting the second operation program, the first electronic unit executes the transfer routine to transfer the second rewrite program to the second retrieving circuitry of the second electronic unit without using the first retrieving circuitry.

8. The processing system of claim 7, wherein, when the external unit rewrites the first and second operating programs, the external unit outputs the second rewrite program to the first electronic unit and then outputs the second operation program after the external unit rewrites the first operating program by the first rewrite program.

9. The processing system of claim 7, wherein the first memory includes a first nonvolatile memory for storing the first operating program and a memory for storing the first rewrite program, while the second memory includes a second nonvolatile memory for storing the second operating program and a memory for storing the second rewrite program.

10. A method of controlling a processing system having at least a first electronic unit and a second electronic unit, the method comprising:

storing a first operating program of the first electronic unit;

retrieving, from an external unit, a first rewrite program for rewriting the stored first operation program, by executing a boot program of the first electronic unit;

newly retrieving, from the external unit, a first operation program by executing the retrieved first rewrite program to rewrite the stored first operation program using the newly retrieved first operation program;

storing a second operating program;

retrieving, through the first electronic unit, a second rewrite program for rewriting the stored second operation program; and newly retrieving, through the first electronic unit, a second operation program by executing the second retrieved rewrite program to rewrite the stored second operation program using the newly retrieved second operation program;

wherein the first rewrite program includes a transfer routine for transferring the second rewrite program to the second electronic unit; and when the first electronic unit receives, from the external unit, a rewrite request for rewriting the second operation program, the first electronic unit executes the transfer routine to transfer the second rewrite program to the second electronic unit.

11. The method of claim 10, wherein, when the external unit rewrites the first and second operating programs, the external unit outputs the second rewrite program to the first electronic unit and then outputs the second operation program after the external unit rewrites the first operating program by the first rewrite program.

12. A method of controlling a processing system having at least a first electronic unit and a second electronic unit, the method comprising:

storing a first operating program of the first electronic unit;

retrieving, from an external unit, a first rewrite program for rewriting the stored first operation program, by executing a boot program of the first electronic unit;

newly retrieving, from the external unit, a first operation program by executing the retrieved first rewrite program to rewrite the stored first operation program using the newly retrieved first operation program;

storing a second operating program;

retrieving, through the first electronic unit, a second rewrite program for rewriting the stored second operation program; and newly retrieving, through the first electronic unit, a second operation program by executing the second retrieved rewrite program to rewrite the stored second operation program using the newly retrieved second operation program;

wherein the first rewrite program includes a transfer routine for transferring the second rewrite program to the second electronic unit; and when the first electronic unit receives, from the external unit, a rewrite request for rewriting the second operation program, the first electronic unit executes the transfer routine to transfer the second rewrite program to the second electronic unit by bypassing the boot program of the first electronic unit.

13. The method of claim 12, wherein, when the external unit rewrites the first and second operating programs, the external unit outputs the second rewrite program to the first electronic unit and then outputs the second operation program after the external unit rewrites the first operating program by the first rewrite program.

14. A method of controlling a processing system having at least a first electronic unit and a second electronic unit, the method comprising:

storing a first operating program of the first electronic unit;

retrieving, from an external unit, a first rewrite program for rewriting the stored first operation program, by executing a boot program of the first electronic unit;

newly retrieving, from the external unit, a first operation program by executing the retrieved first rewrite program to rewrite the stored first operation program using the newly retrieved first operation program;

storing a second operating program;

retrieving, through the first electronic unit, a second rewrite program for rewriting the stored second operation program; and newly retrieving, through the first electronic unit, a second operation program by executing the second retrieved rewrite program to rewrite the stored second operation program using the newly retrieved second operation program;

wherein the first rewrite program includes a transfer routine for transferring the second rewrite program to the second electronic unit; and when the first electronic unit receives, from the external unit, a rewrite request for rewriting the second operation program, the first electronic unit executes the transfer routine to transfer the second rewrite program to the second electronic unit without execution by the boot program of the first electronic unit.

15. The method of claim 14, wherein, when the external unit rewrites the first and second operating programs, the external unit outputs the second rewrite program to the first electronic unit and then outputs the second operation program after the external unit rewrites the first operating program by the first rewrite program.

* * * * *